(No Model.)　　　　　　　　　　　　　　　　　　2 Sheets—Sheet 1.
G. F. EDSON.
CORN PLANTER.
No. 282,288.　　　　　　　　　Patented July 31, 1883.
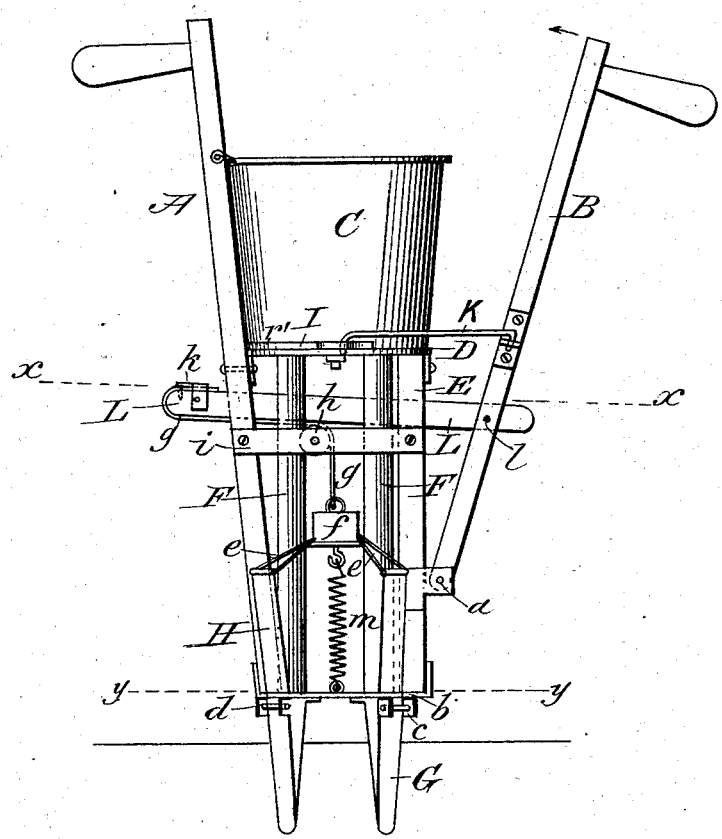
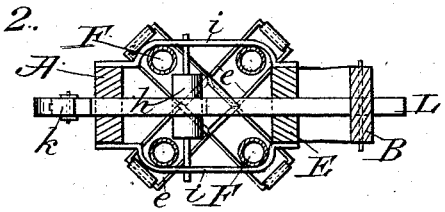
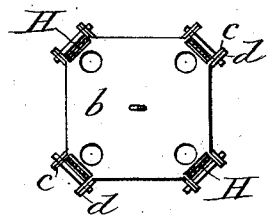
Attest:
F. H. Schott
H. Harrison
Inventor:
George F. Edson (No Model.) 2 Sheets—Sheet 2.

G. F. EDSON.
CORN PLANTER.

No. 282,288. Patented July 31, 1883.

Attest:
F. H. Schott
H. Harrison

Inventor:
George F. Edson,
Jw. C. H. Watson & atty.

N. PETERS. Photo-Lithographer, Washington, D. C.

UNITED STATES PATENT OFFICE.

GEORGE F. EDSON, OF VAN WERT, OHIO.

CORN-PLANTER.

SPECIFICATION forming part of Letters Patent No. 282,288, dated July 31, 1883.

Application filed April 18, 1883. (No model.)

*To all whom it may concern:*

Be it known that I, GEORGE F. EDSON, a citizen of the United States, residing at Van Wert, in the county of Van Wert and State of Ohio, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in hand corn-planters, the object of the invention being to produce devices whereby the kernels are separated and planted in the hill at equal distances from each other; and it consists in the peculiar construction and arrangement of parts, as will be hereinafter more fully described and claimed.

Figure 4:
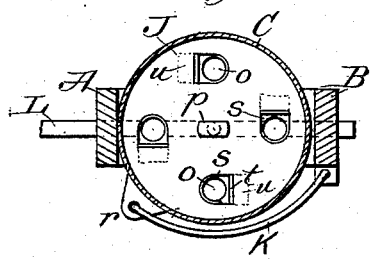
Figure 5:
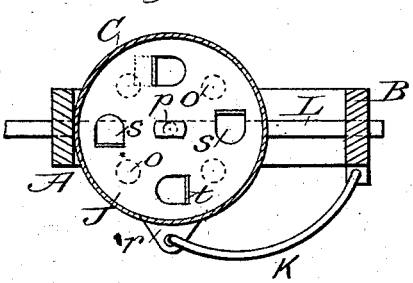
Figure 6:
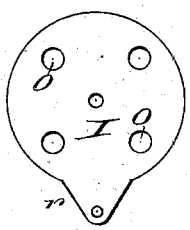
Figure 7:
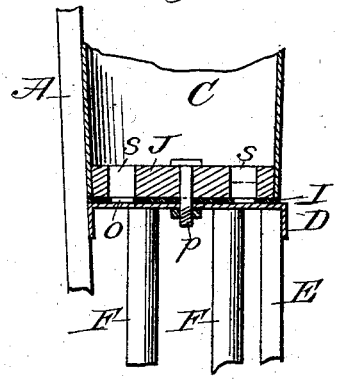
Figure 8:
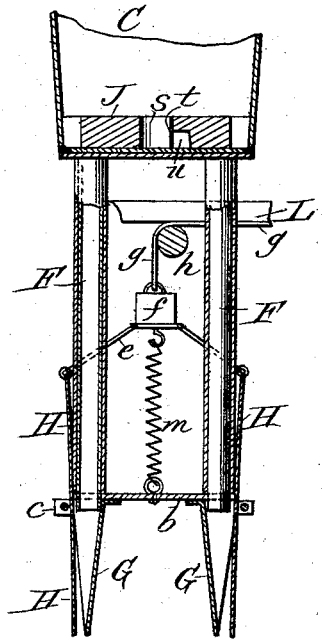
Figure 9:
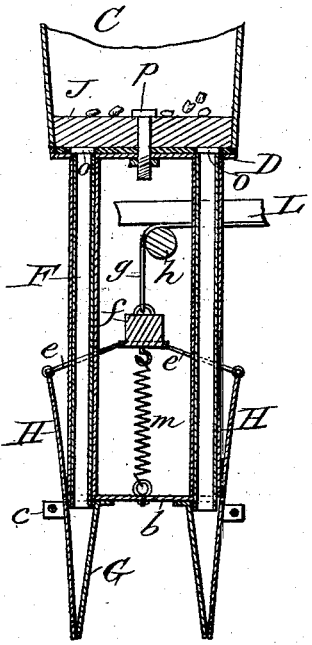
Figure 10:
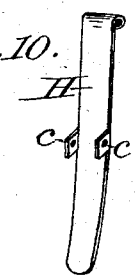

In the annexed drawings, which illustrate my invention, Figure 1 is a side elevation of my improved hand corn-planter. Fig. 2 is a horizontal section on the line $x\ x$ of Fig. 1. Fig. 3 is a similar section on the line $y\ y$, Fig. 1. Fig. 4 is a horizontal section through the seed-box, showing the automatic vibrating feed-disk in position to receive the kernels, and closed as respects the conveyers or distributing-tubes. Fig. 5 shows a similar section, with feed-disk in a position open as regards the conveyer-tubes. Fig. 6 is a plan view of the feed-disk. Fig. 7 is a vertical section through the seed-box. Fig. 8 is a vertical section, showing the lips open; Fig. 9, a similar section, showing the lips closed upon the shoes. Fig. 10 is a perspective view of one of the lips detached.

The letter A represents a stationary handle, and B a movable one. To the upper end of the handle A is secured the seed box or reservoir C, for holding the corn or other grain to be planted, and provided with a hinged lid or cover. D represents the bottom of the seed-box, which is secured to the handle A on one side and a vertical bar or beam, E, on the other, as shown in Fig. 1. The movable handle B is pivoted at its lower end to the beam E at the point $a$.

F F are the conveyers or distributing-tubes, four in number, in the bottom D, at equal distances from each other, in the form of a square. These tubes F extend to and are secured in a base-plate, $b$, projecting through the same a short distance into the shoes or points G. The shoes, four in number, are secured to the under side of the base-plate $b$, one under each tube F. They are wedge-shaped or tapering, with rounded and sharpened points to adapt them to be thrust into the ground or hill, thus making the necessary openings for the seed. Each of these shoes G is covered with a metal strip or movable lip, H, which is pivoted or hinged by its lugs or ears $c$ to lugs $d$ on the upper end of the shoe, as shown in Fig. 3. These lips extend above their pivots a suitable distance, and are provided at their ends with loops $e\ e$, which connect them with a head or weight, $f$, located centrally between the tubes F. A spiral spring, $m$, connects the head with the base-plate $b$, for returning the head to its normal position. To this head $f$ is attached a strap, $g$, which passes over a pulley, $h$, placed a short distance over it, and bearing in the side pieces of braces $i$, as shown in Figs. 1 and 2. The strap $g$ passes from the pulley $h$ to a reciprocating arm, L, over the pulley, and is fastened around one end of the same by a clip, $k$. This arm L extends at right angles to the handles A and B, and is pivoted at $l$ to handle B and passes through openings or slots in the beam E and handle A. Resting on the bottom D of the seed-box is the automatic vibratory seed-disk I, which has four perforations, $o\ o$, to correspond with the four tubes or conductors F F. Immediately over the disk I is a circular stationary separator, J, kept in place by the central bolt, $p$, which passes through the center of the block-disk I and bottom D, and is provided with a nut, as shown. The disk I is provided with a lug, $r$, projecting through a slot, $r'$, in the seed-box, to which lug is fastened a connecting-rod, K, the other end of which rod is secured to the movable handle B, as clearly shown in Figs. 4 and 5. The block J is provided with four apertures, $s$, equally distant from each other, arranged intermediate with the openings or tubes in the bottom D. Each of the openings $s$ is provided with a brush or sweeper, t, in front of each of which is a cavity, n, Figs. 4 and 8, to afford play to the brush and aid in conveying the grain to the conductors. Into these openings s a part of the corn falls, or is separated to be fed by the disk I to the conductors. This planter is designed to convey a single kernel of corn to each opening in the hill, and the conductors and shoes are made of a proper size for this purpose.

The operation of the planter is as follows: The operator, by pressing the movable handle toward the stationary one, rotates the feed-disk I, the lug r, working in the slot r', bringing the holes o under the apertures s in the separator-block, as shown in Fig. 4. By reversing the motion of the handle the seed which has fallen into the holes o is swept under the brushes to the tubes F in the bottom D, and passes through the same to the shoes G, which are now closed by the lips H. Throwing the handle in again moves the reciprocating arm L forward, which draws on the strap g, raising the weight or head f, and by means of the loops e e moving the lips H and opening the shoes, thus allowing the kernels to drop out of the shoes into the holes in the hill made by thrusting the shoes or points into the ground. Removing the shoes from the ground covers the seed. By reversing the movement of the handle the arm L is moved back again, and the weight and spring close the lips, while another kernel falls down each tube to be planted by repeating the operation.

It is obvious that instead of four a greater or less number of tubes or conductors may be used, the necessary changes being made without departing from the spirit of my invention.

Having thus described my invention, what I claim as new, and desire to secure by Letters Patent, is—

1. In a hand corn-planter, the combination of the handles A B, seed-box C, having perforated bottom D, feed-disk I, connecting-rod K, separator-block J, provided with brushes t, the tubes F, shoes G, pivoted lips H, reciprocating arm L, movable head f, strap g, pulley h, and loops e e, substantially as shown and described.

2. In a hand corn-planter, the combination of the handles A B, seed-box C, feed-disk I, separator-block J, tubes F, shoes G, having pivoted lips H, the reciprocating arm L, movable head f, loops e e, strap g, pulley h, and spring m, substantially as shown and described.

In testimony whereof I affix my signature in presence of two witnesses.

GEORGE FOX EDSON.

Witnesses:
A. J. PORTER,
GEO. E. WELLS.